(12) United States Patent  
Jensen et al.

(10) Patent No.: US 9,035,947 B2
(45) Date of Patent: May 19, 2015

(54) TOOL FOR VIDEO GAME APPLICATION DEVELOPMENT

(75) Inventors: Karl E. Jensen, Whistler (CA); Jeffrey E. Skelton, Port Moody (CA)

(73) Assignee: ELECTRONICS ARTS INC., Redwood City, CA (US)

( * ) Notice: Subject to any disclaimer, the term of this patent is extended or adjusted under 35 U.S.C. 154(b) by 327 days.

(21) Appl. No.: 13/598,812

(22) Filed: Aug. 30, 2012

(65) Prior Publication Data

US 2013/0303244 A1 Nov. 14, 2013

Related U.S. Application Data

(60) Provisional application No. 61/644,155, filed on May 8, 2012.

(51) Int. Cl.
*G06T 15/00* (2011.01)
*A63F 13/30* (2014.01)

(52) U.S. Cl.
CPC ............ *A63F 13/12* (2013.01); *G06T 15/00* (2013.01); *A63F 2300/209* (2013.01); *A63F 2300/552* (2013.01); *A63F 2300/6018* (2013.01)

(58) Field of Classification Search
None
See application file for complete search history.

(56) References Cited

U.S. PATENT DOCUMENTS

| | | | | |
|---|---|---|---|---|
| 7,511,712 B1 * | 3/2009 | Johns et al. | | 345/522 |
| 2009/0144652 A1 * | 6/2009 | Wiley | | 715/800 |
| 2010/0046027 A1 * | 2/2010 | Lee | | 358/1.15 |
| 2011/0040754 A1 * | 2/2011 | Peto et al. | | 707/736 |

* cited by examiner

*Primary Examiner* — Daniel Hajnik
(74) *Attorney, Agent, or Firm* — Kacvinsky Daisak Bluni PLLC

(57) ABSTRACT

Techniques are described that can that can modify content in a video game application executing on a game platform. The technique includes communicatively coupling with the game platform to exchange messages with the game platform. A tool may receive data representative of a version of a screen rendered by the game platform. The tool may then render its own version of the screen and modify the content data that comprises the screen image. The tool may then send a content modification message to the game platform, the message including data representative of the modifications made by the tool. The game platform may then modify and render a new version of the screen in the game platform based on the modification message.

13 Claims, 5 Drawing Sheets

"DISTRIBUTED ENVIRONMENT"

"DISTRIBUTED ENVIRONMENT"

300

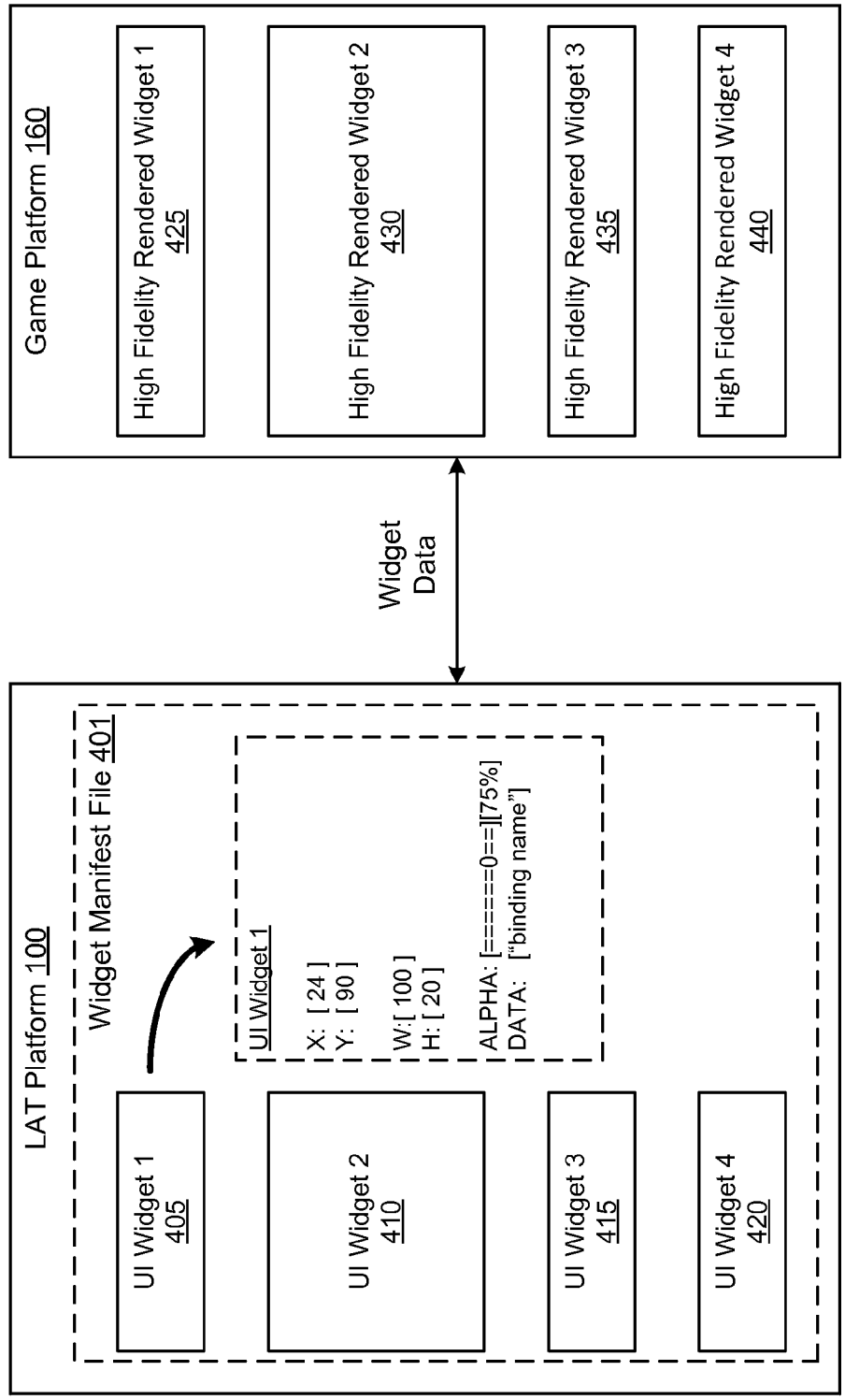

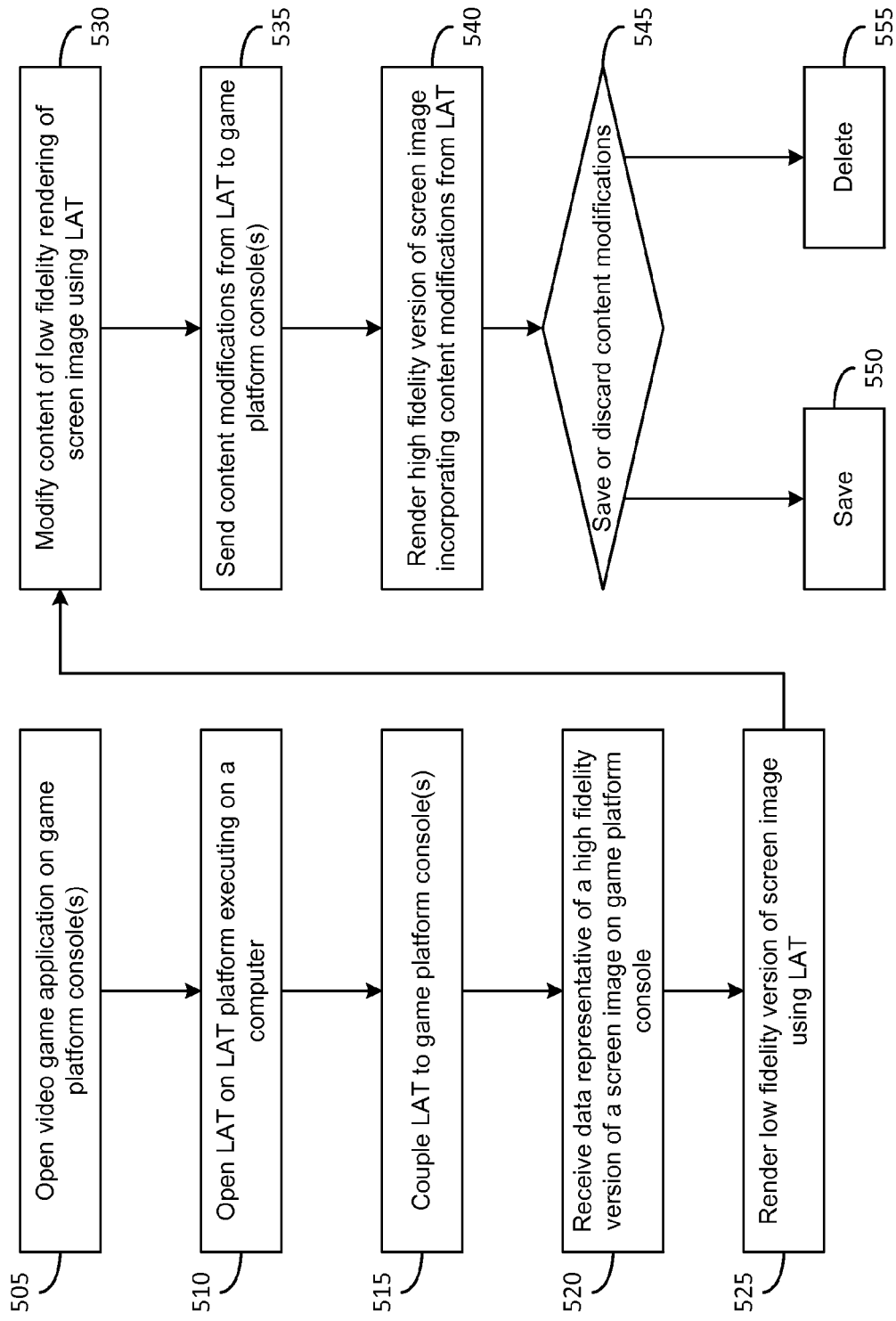

TOOL FOR VIDEO GAME APPLICATION DEVELOPMENT

CROSS-REFERENCE TO RELATED APPLICATIONS

This application is related to and claims the benefit of U.S. Provisional Patent Application No. 61/644,155 filed on May 8, 2012 and entitled, "Live Authoring Tool for Video Game Application Development".

BACKGROUND

When creating/modifying content associated with video games, the feedback loop for content creators is extremely time consuming. Content modifications to a video game take up valuable time before the modifications can be viewed and evaluated as they would appear in the video game application. There is currently too much reliance on software engineers as opposed to content creators to deliver content modifications. What is needed is a tool that permits a content creator to obtain control over a number of configurable properties of user interface elements that were previously configured solely by software engineers. Such a tool may result in a more efficient streamlined development process for video game applications.

BRIEF DESCRIPTION OF THE DRAWINGS

FIG. 4 illustrates one embodiment of a corresponding widget representation to be exchanged between a tool for modifying video game application content and a game console platform operative to execute a video game application.

FIG. 5 illustrates one embodiment of a logic flow in which a tool may be used to modify the content of a video game application.

DETAILED DESCRIPTION

Figure 1:
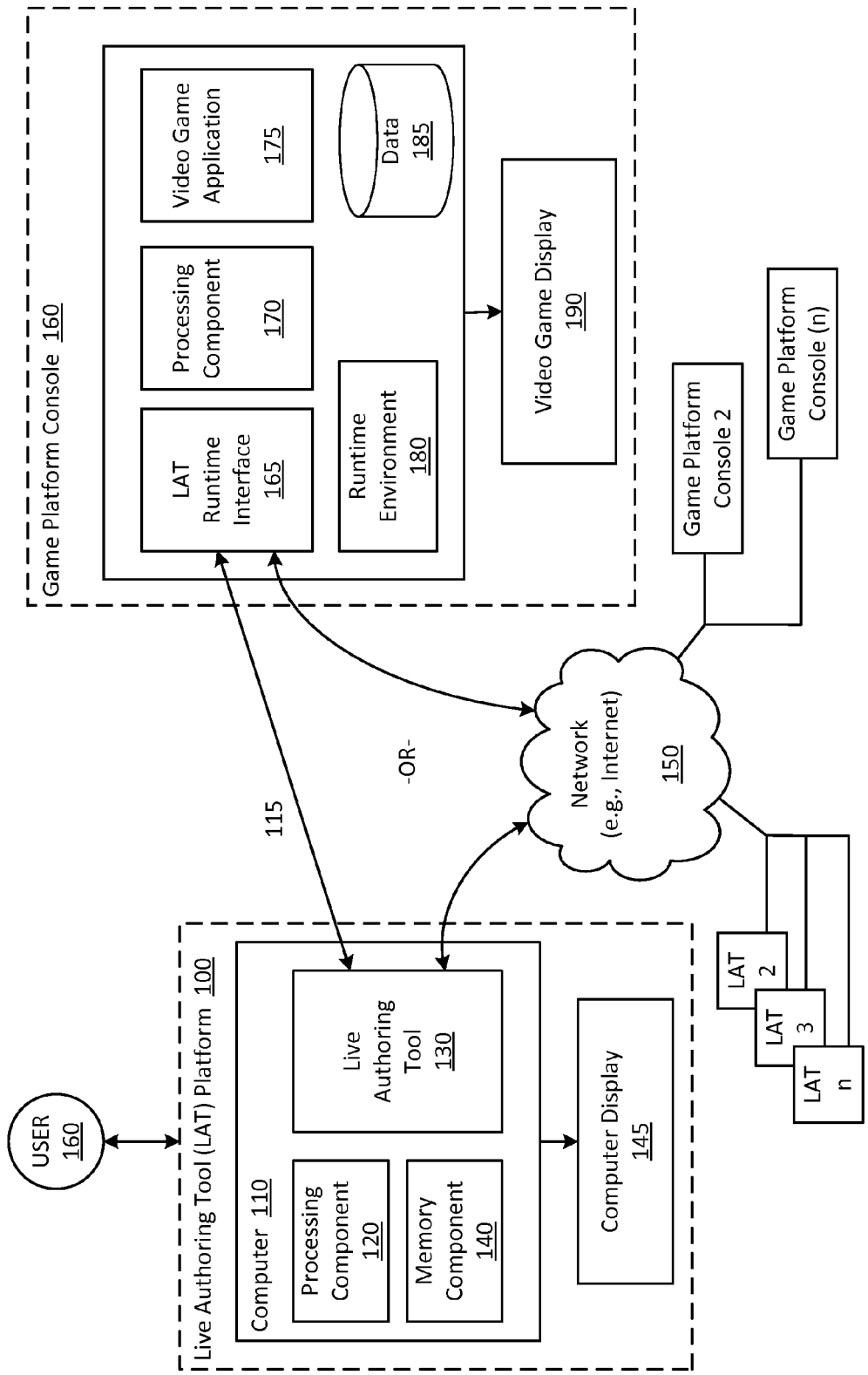
FIG. 1 illustrates one embodiment of a system implementing a tool for modifying content in a video game application during development.

The current development process for a video game application builds content for the video game application in a tool such as, but not limited to, a flash editor tool. Content may include, but is not necessarily limited to, buttons, labels, grids, toggles, and other common or uncommon user interface (UI) elements. The content may further be comprised of configurable properties. Examples of configurable properties within a screen include, but are not necessarily limited to, location of elements, size of elements, transparency/opacity of elements, data that elements are bound to, style properties such as font, size, color, sound effects based on events, and animations based on events. Elements may represent animated images or imagery such as, but not limited to, characters, structures, obstacles, etc., that comprise the scenery and action that occurs during a game session.

The development process may be characterized somewhat as a trial and error process in which content is created, implemented, tested, and evaluated as to whether it should be included in the video game application. Sometimes the proposed content is accepted and sometimes it is rejected necessitating additional content adjustments. Inserting the content adjustments into the video game application can be a time intensive and laborious process that generally requires the cooperation and collaboration of content creators and software engineers. The content creators may be responsible for creating content while the software engineers may be responsible for implementing the content into the application so that it may be evaluated during development. When the content is ready to be implemented into the video game application, it must go through a pipeline to the destination machine (e.g., a game console) and then be reloaded which can take between fifteen (15) seconds and three (3) minutes depending on at what point the content exists in the video game application. This process is repeated for every change regardless of the scope of the change. Since a content creator/developer may make large numbers of changes during the development process, the time inefficiency that is a part of the system may become magnified. This is especially true when the content change itself may only take a few seconds.

Various embodiments disclosed herein permit a user/developer to live link to one or more game console systems running the game application. The manipulation of elements of content using a live authoring tool (LAT) may result in instant feedback of content modifications in the game application. The instant feedback provided is a vast improvement over the delivery/reload scenario currently employed. In addition, one or more LATs may be connected to one or more game console platforms over a network. Such a configuration allows for easier collaboration for users/developers that may not be in the same location. In other words, multiple developers using multiple LATS may simultaneously collaborate to develop a video game application. Moreover, the LATs may be in communication with multiple game consoles running the video game application. Thus, content modifications may be evaluated for different game console platforms at the same time.

In general, a video game application is loaded onto a game application console and a LAT may be used to navigate to a screen to be modified. The LAT may be running on a separate computer that is remotely located from the game console. The LAT and the game console may be communicable over a direct point-to-point connection or over a network such as a local area network (LAN) intranet, wide area network (WAN) intranet, the Internet, or any combination thereof. Alternatively, if the game application console happens to be a computer, the LAT may be co-resident and executable on the same computer.

The video game application may push video game information to the LAT to sync the current state of the video game application and the LAT. Using a property editor the LAT may present, on a first display, a low fidelity version of the layout of a desired screen to be modified. One purpose of the low fidelity version of the layout is to generate assets that can be used in the video game application. The intent is to allow the LAT to hook up to different game console platforms. If the LAT also has to contain the same look as the video game application then two sets of assets need to be managed, or at least two systems using the same set of assets. For example, it is possible that a mobile implementation of a video game application may be different than a game console implementation, a video game application may change year over year, or different video game applications may use the LAT. The low fidelity version of the desired screen layout allows the LAT to be hooked up in any of the aforementioned scenarios and still work in the same manner.

The LAT may be used to modify content (e.g., user interface elements) in a screen. The content modifications may then be sent as a message from the LAT to the video game console executing the video game application. The messages containing the content modifications are sent immediately as they occur in the LAT and may be seen immediately in real-time in the executing video game application game console environment. The re-configured content/element properties may then be saved out as data for future use with the video game application or rejected/deleted.

The content modification process may be based on messages passed back and forth between the LAT to the video game application executing in a game console platform. In addition, multiple instances of the video game application executing on different video game console platforms may be coupled with a single LAT to see how the different platforms would render the modified content data. Content modification messages may be sent to all connected video game console platforms or can be selectively sent to specific video game console platforms for evaluation.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

FIG. 1 illustrates one embodiment of a system implementing a LAT for modifying content in a video game application during development. A LAT platform computer system 100 is generally directed to communicating and exchanging data with a game platform console 160 computer system. The communication may be direct 115 or over a network 150 such as a local area network (LAN), a wide area network (WAN), the Internet, or any combination thereof. In addition, multiple LAT platforms 100 may be coupled with multiple game platform consoles 160 in a many-to-one, a one-to-many, or a many-to-many implementation to further enhance the flexibility of embodiments described herein.

A LAT platform 100 generally comprises a computer 110 (e.g., a personal computer (PC)) under control of a processing component 120. The processing component 120 may be responsible for executing a live authoring tool (LAT) 130 application or module. The LAT platform 100 may further include a memory component 140. In addition the LAT platform 100 may be coupled with a computer display device 145.

The LAT 130 may be responsible for receiving a high fidelity version of a desired screen image from a game console platform 160. The LAT 130 may then convert the high fidelity version of the screen image to a low fidelity version to be displayed on the computer display device 145. A user 105 (e.g., content creator or developer) may make modifications to the content represented by the low fidelity version of the screen image using the LAT 130. The modified content may then be returned to the game console platform 160 for rendering.

In an alternative embodiment, the LAT 130 may not need to convert the high fidelity version of the screen to a low fidelity version of the screen. Some embodiments of the LAT 130 may make content modifications directly to the data representative of the high fidelity version of the screen which may be returned to a game platform console 160 for rendering and evaluation.

The memory component 140 may be included to store data as needed. The memory component 140 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. The memory component 140 may include non-volatile memory and/or volatile memory.

The computer display device 145 may provide visual feedback to a user 105. The user 105 may interact with the computer 110 via a variety of well known input devices (not shown) and user interfaces (UIs) also not shown.

The game platform console 160 generally comprises a processing component 170 that may be responsible for managing the various functions of the game platform console 160 that include a runtime environment 180 for executing a video game application 175. A data storage component 185 may be included to store data as needed by the video game application 175. A video game display 190 may provide visual feedback pertaining to the video game application 175.

The runtime environment 180 may include a game engine to execute the video game application 175. For example, a video game application may be stored on a disk that may be loaded into the game platform console 160 via an external memory device such as a DVD drive. Alternatively, the video game application may be sent directly from a source computer and stored in data storage component 185 before being loaded into the runtime environment 180 to be executed by a game engine.

A LAT runtime interface 165 may facilitate communication with the LAT platform 100. The LAT runtime interface 165 may capture screen images executing in the runtime environment 180 and push information to the LAT 130 to synchronize the current state of the video game application 175 with the LAT 130. The LAT runtime interface 165 may also receive content modification messages from the LAT platform 100 and insert them into the runtime environment 180 on a real-time basis. The content modifications may be viewed on the video game display 190 and a determination made whether to save the content modifications in data storage component 185.

Thus, the game platform consoles 160 used in the development process each include and use the LAT runtime interface 165 capable of exchanging messages with the LAT 130 such that the LAT 130 can provide data back to the various game platform consoles 160 in a format that can be understood by that game platform console 160.

Figure 2:
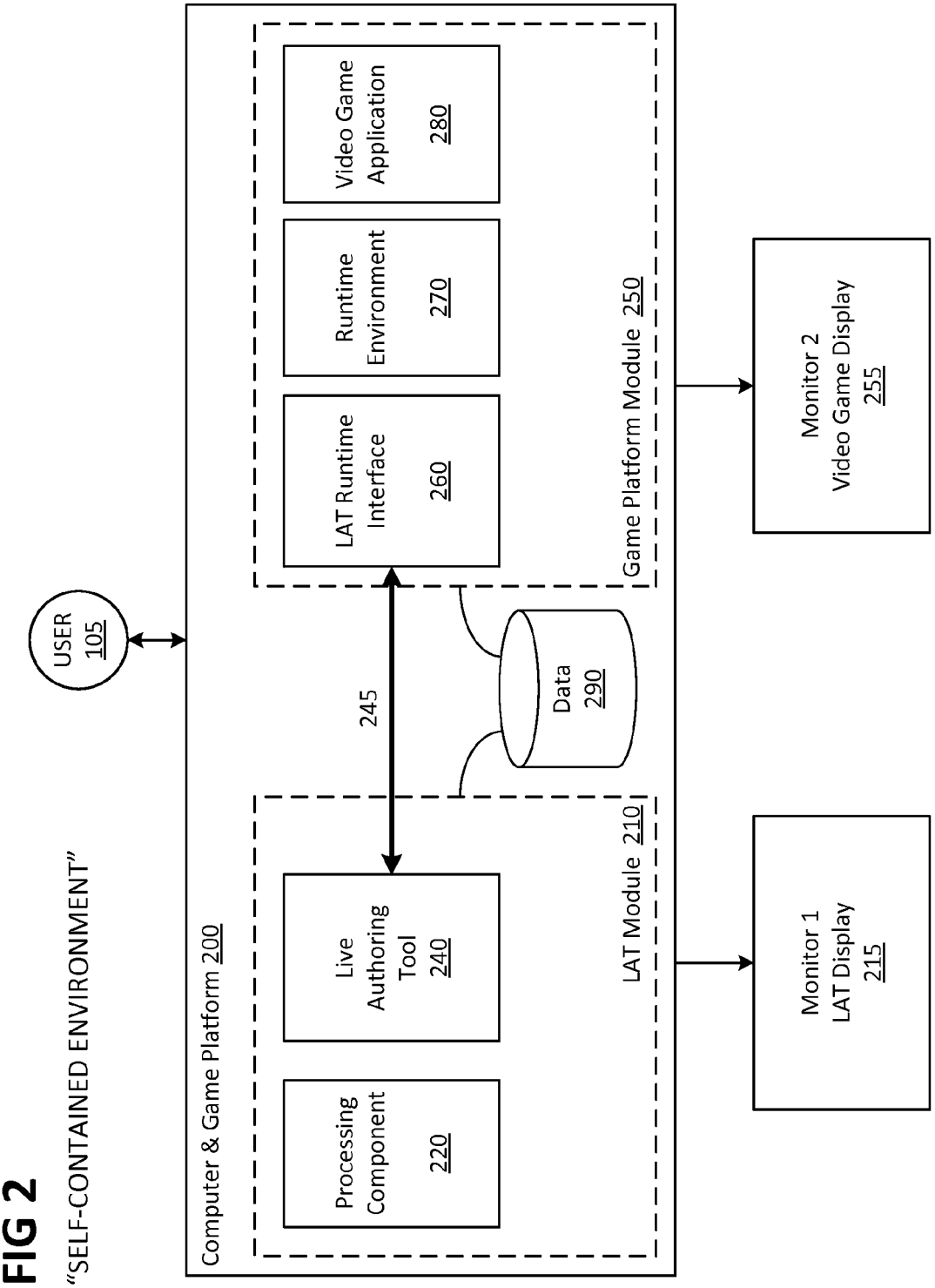
FIG. 2 illustrates another embodiment of a system implementing a tool for modifying content in a video game application during development.

FIG. 2 illustrates another embodiment of a system implementing a LAT for modifying content in a video game application during development. This embodiment allows a single machine labeled computer and game platform 200 to co-host a LAT platform module 210 and game platform module 250. The computer and game platform 200 may be split functionally into the LAT platform module 210 and the game platform module 250.

The LAT platform module 210 generally comprises a processing component 220. The processing component 120 may be responsible for executing a live authoring tool (LAT) 240 application. In addition the LAT platform module 210 may be coupled with a LAT monitor 215 operative to display data from the LAT 240. For example, the LAT monitor 215 may provide visual feedback to a user 105. The user 105 may interact with the computer and game platform 200 via a variety of well known input devices (not shown) and user interfaces (UIs) also not shown.

The LAT 240 may be responsible for receiving a high fidelity version of a desired screen image from the game platform module 250. The LAT 240 may then convert the high fidelity version of the screen image to a low fidelity version to be displayed on the LAT monitor 215. A user 105 (e.g., content creator or developer) may make modifications to the content represented by the low fidelity version of the screen image using the LAT 240. The modified content may then be returned to the game platform module 250 for rendering.

The game platform module 250 generally comprises a runtime environment 270 for executing a video game application 280. A video game display 255 may provide visual feedback pertaining to the video game application 280.

The runtime environment 270 may include a game engine to execute the video game application 280. For example, a video game application may be stored on a disk that may be loaded into the game platform module 250 via an external memory device such as a DVD drive. Alternatively, the video game application may be sent directly from a source computer and stored in a data storage component 290 before being loaded into the runtime environment 270 to be executed by a game engine.

A LAT runtime interface 260 may facilitate communication with the LAT platform module 210. The LAT runtime interface 260 may capture screen images executing in the runtime environment 270 and push information to the LAT 240 to synchronize the current state of the video game application 280 with the LAT 240. The LAT runtime interface 260 may also receive content modification messages from the LAT platform module 210 and insert them into the runtime environment 270 on a real-time seamless basis. The content modifications may be viewed on the video game display 255 and a determination made whether to save the content modifications in data storage component 290.

The LAT platform module 210 and the game platform module 250 may further be coupled with the data storage component 290. The data storage component 290 may be included to store data as needed. The data storage component 290 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. The memory component 140 may include non-volatile memory and/or volatile memory.

In the embodiment of FIG. 2, a single user can execute a video game application 280 and simultaneously make content modifications to the video game application 280 using LAT 240. The content modifications may be passed over a bus 245 to the LAT runtime interface 260 and implemented in real-time by the runtime environment 270 executing the video game application 280 thereby providing instant feedback of what the content modifications look like when rendered on an actual game platform.

Figure 3:
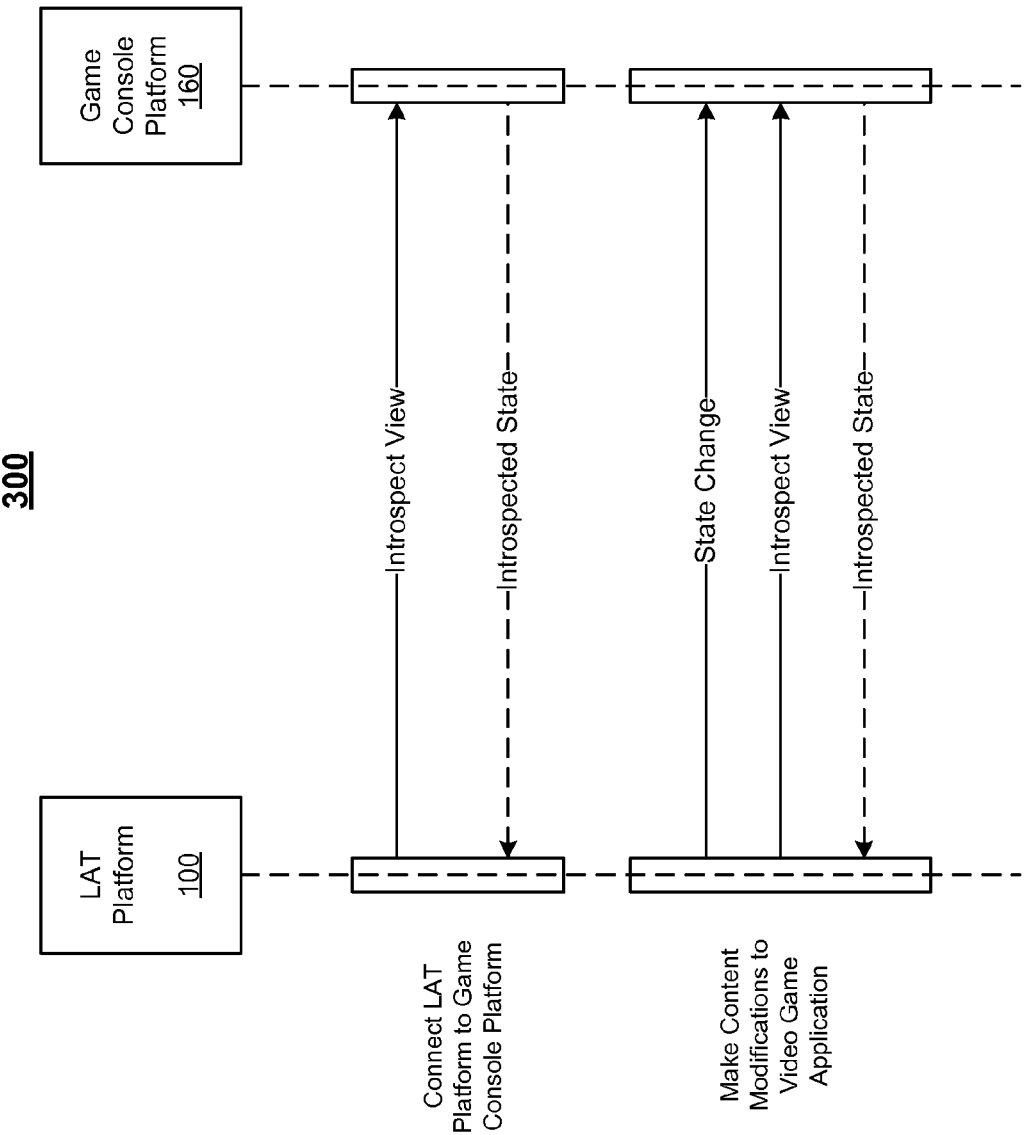
FIG. 3 illustrates one embodiment of a messaging protocol between a tool for modifying video game application content and a game console platform operative to execute a video game application.

FIG. 3 illustrates one embodiment of a messaging protocol between a LAT platform 100 and a game console platform 160. The messaging protocol may describe the types of messages and data exchanged between components of the LAT platform 100 and components of the game console platform 160. A precursor step may be to establish a connection between the LAT platform 100 and the game console platform 160. The LAT platform 100 via the LAT 130 may navigate to a certain point in a video game application 175 being executed by the runtime environment 180 and request an introspect view of a desired screen image. An introspect view refers to a message sent from the LAT platform 100 to the game console platform 160 that requests the current view state information. The game platform 160 may then return data indicative of an introspected state representative of the requested introspect view.

The LAT platform 100 via LAT 130 may convert the data indicative of the introspected state representative of the requested introspect view to a low fidelity screen image. A user 105 executing the LAT 130 may make content modifications directly to the low fidelity version of the requested screen image. The content modifications may be organized as state changes that may be returned to the game console platform 160 via the LAT runtime interface 165. The state changes may then be implemented in real-time within the runtime environment and evaluated using the video game display 190. The process may be repeated as necessary to make further changes.

FIG. 4 illustrates one embodiment of a corresponding widget representation to be exchanged between a LAT 130 and a game platform console 160. In the LAT 130 view, a low (or high) fidelity representation of what is currently being displayed by the game console 160 on the video game display 190 may be seen on the computer display 145. In addition, the properties of each object or element may be seen and modified. Such content modifications may be reflected back to the game platform via the messaging described in FIG. 3 using the system of FIG. 1 or FIG. 2.

The messaging may include a widget manifest file. The widget manifest file may be indicative of the various UI elements that are included in a screen image. Each widget may represent a different UI element in a screen image. The widget manifest file may include, but is not limited to, one or more sets of global properties applicable to all widgets. Each widget may comprise widget data including, but not limited to, a technology independent common name identifier (e.g., Label), a technology dependent runtime name (e.g., ux::Flash::Label), which global property set(s) are to be inherited, a list of properties that are inspect-able and/or modifiable using the LAT 130, and a list of defaults for any properties that require defaults for when a new widget is constructed. The widget data list of properties may include color, size, shape, and other low fidelity visual parameters for UI elements.

A user 105, by way of LAT 130, may relocate a widget, modify the properties of a widget, add a new widget, and delete a widget. The combination of one or more of the aforementioned LAT widget functions may modify the content of the screen image at issue. If a user 105 moves a widget, the LAT 130 creates and sends a message containing widget identifying data pertaining to each pixel to the game platform console 160. The LAT runtime interface 165 receives the message and modifies a corresponding high fidelity version of the widget to match what was done by the LAT 130. The content modifications contained in the widget are then rendered by the runtime environment 180 to present a real-time updated view of the screen containing the widget on the video game display 190.

If a user 105 modifies properties of a widget, the LAT 130 creates and sends a message containing widget identifying data and the properties that were modified. The LAT runtime interface 165 receives the message and modifies a corresponding high fidelity version of the widget to match what was done by the LAT 130. The content modifications contained in the widget are then rendered by the runtime environment 180 to present a real-time updated view of the screen containing the widget on the video game display 190.

If a user 105 adds a new widget, the LAT 130 selects a widget from the memory component 140 of the LAT platform and creates and sends a message containing widget identifying data and the widget to construct. The LAT runtime interface 165 receives the message and constructs a corresponding high fidelity version of the widget. The new widget is then rendered by the runtime environment 180 to present a real-time updated view of the screen containing the new widget on the video game display 190. Alternatively, the widget may be selected from a common repository that may be under the control of a separate widget server. In this manner, multiple LAT platforms 100 may create and store new widgets in a central location eliminating the need for each LAT platform 100 to create and maintain its own set of widgets.

If a user 105 deletes a widget, the LAT 130 creates and sends a message containing widget identifying data and the widget to delete. The LAT runtime interface 165 receives the message and deletes a corresponding high fidelity version of the widget. The runtime environment 180 renders the screen to present a real-time updated view of the screen with the widget deleted on the video game display 190.

The user 105 may then save changes that have been made. The LAT 130 may send a message instructing the game platform console 160 to save to the runtime environment. The game platform console 160 via processor component 170 may then save the current state of the screen to a layout file that will be used to load this particular screen view in the future.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

FIG. 5 illustrates one embodiment of a logic flow 500 in which a LAT 130 operating on a first machine may be used to modify the content of a video game application 175 operating on a second machine during development. In alternative embodiments the LAT and the video game application may operate on separate components of the same machine. The logic flow 500 may be representative of some or all of the operations executed by one or more embodiments described herein including those illustrated in FIGS. 1-4.

In the illustrated embodiment shown in FIG. 5, the logic flow 500 may open a video game application on a target game platform console 160 at block 505. For example, a target game platform console 160 may be a modified version of a standard game platform console. Each target game platform console 160 may be associated with a runtime environment 180 including, but not limited to, a personal computer (PC), an Xbox™ platform, a Playstation™ platform, a Wii™ platform, mobile computing device (e.g., smartphone, tablet), etc. The combination of game console and runtime environment may comprise a game platform. In the embodiments herein, the target game platform console 160 may be a modified to include a LAT runtime interface 165 operative to exchange communications with a LAT 130 executing on a remote or co-hosted LAT platform 100. The embodiments are not limited to this example.

In the illustrated embodiment shown in FIG. 5, the logic flow 500 may then launch a LAT 130 at block 510. For example, the LAT 130 may be resident on a LAT platform 100 executing on a personal computer (PC) or other computer system 110. The LAT platform 100 and the game platform console 160 may be communicable with one another via the LAT runtime interface 165 that has been incorporated into the game platform console 160. The embodiments are not limited to this example.

In the illustrated embodiment shown in FIG. 5, the logic flow 500 may then connect and interface with a game platform console executing a video game application at block 515. For example, the LAT 130 may send a message to a game platform console 160 by way of the LAT runtime interface 165 asking the game platform console 160 to provide information regarding its game platform. This information may include identifying the type of game platform (e.g., personal computer (PC), an Xbox™ platform, a Playstation™ platform, a Wii™ platform, mobile computing device, smartphone, tablet) as well as any configuration properties. Configuration properties may include, but are not limited to, items such as screen size, screen resolution, audio capabilities, processor capabilities, and the like. In addition, the LAT 130 may connect with multiple different game platform consoles 160 to evaluate content modifications across a variety of platforms at once. The embodiments are not limited to this example.

In the illustrated embodiment shown in FIG. 5, the logic flow 500 may receive data representative of a high fidelity version of a screen image on the video game console 160 at block 520. For example, the LAT 130 may send a request message to the game platform console 160 by way of the LAT runtime interface 165 asking the game platform console 160 to forward the image data indicative of the current screen in the executing video game application 175. The game platform console 160 may return the requested data to the LAT 130 in the form of a high fidelity version of the requested screen image. The embodiments are not limited to this example.

In the illustrated embodiment shown in FIG. 5, the logic flow 500 may render a low fidelity version of the received data representative of a high fidelity version of a screen image at block 525. For example, the LAT 130 may convert the high fidelity version of the received screen image to a low fidelity version of the same screen image. The low fidelity version of the screen image may then be rendered on a display 145 coupled with the LAT platform 100. The embodiments are not limited to this example.

In the illustrated embodiment shown in FIG. 5, the logic flow 500 may modify content within the low fidelity version at block 530. For example, the LAT 130 may perform multiple content modifications to the low fidelity version of the screen image. The low and high fidelity versions of the screen image may be comprised of widgets. A widget may represent an element within the view of the screen image. An element may be a character, a structure, an object, etc. A collection of widgets may be organized into a widget manifest file. The widget manifest file may include additional global properties that pertain to the screen image, such as background color, etc. Thus, the data representative of a screen image may be fully described by the contents of the widget manifest file and its associated widgets. By amending or altering properties of the various widgets and global properties of the widget manifest file, a user may edit the screen image. As earlier described, some of these content modifications include relocating a widget, modifying the properties of a widget, adding a new widget, and deleting a widget. The embodiments are not limited to these examples.

In the illustrated embodiment shown in FIG. 5, the logic flow 500 may send content modifications to the game console platform 160 at block 535. For example, the LAT 130 may send the widget modifications back to the game platform console 160 by way of the LAT runtime interface 165. The widget modifications may then be forwarded to the runtime environment 180. The embodiments are not limited to this example.

In the illustrated embodiment shown in FIG. 5, the logic flow 500 may render the content modifications in a high fidelity version of the video game application 175 on the game console platform 160 at block 540. For example, the runtime environment 180 may enable the widget modifications in real-time for the high fidelity version of the screen image. As a result, the image presented on the video game display 190 may be refreshed to illustrate the content changes made to that screen image. The video game application 175 need not be re-loaded or re-booted thereby saving valuable time. The developer can see, in real-time, the net effect of the changes made by the LAT 130. Since the development process often requires multiple changes regardless of how big or small, the cumulative time saved in making and evaluating the content changes is significant. This leads to a quicker development cycle. The embodiments are not limited to this example.

In the illustrated embodiment shown in FIG. 5, the logic flow 500 may decide whether to save or delete the content modifications at block 545. For example, the user 105 may view in real-time the effect of the content modifications to the video game application 175 and make a determination whether to save the content modifications at block 550 or delete the content modifications at block 555. The user may cause the LAT 130 to save the changes that have been made to the high fidelity version of the screen by sending a message to the target game platform console 160 to save the modifications made to the runtime environment 180. The target game platform console 160 may then save the current state of that screen to a layout file that will then be used to load this view in the future. The embodiments are not limited to this example.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

One or more aspects of at least one embodiment may be implemented by representative instructions stored on a non-transitory machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. A computer implemented method of modifying content in a video game application executing on a game platform console comprising:
   receiving data representative of a high fidelity version of a screen image rendered by the game platform console executing the video game application, the data representative of the high fidelity version of the screen image comprising a first widget manifest file comprised of a first set of widget files, each widget file representative of an element in the screen image and containing properties describing the element, the first widget manifest file including global properties pertaining to the screen image;
   rendering a low fidelity version of the screen image using the data representative of the high fidelity version of the screen image, the data representative of the low fidelity version of the screen image comprising a second widget manifest file comprised of a second set of widget files, each widget file representative of an element in the screen image and containing properties describing the element, the second widget manifest file including global properties pertaining to the screen image;
   modifying the contents of the low fidelity version of the screen image, the modifying the contents of the low fidelity version of the screen image comprising modifying the second widget manifest file and the second set of widget files; and
   sending a content modification message to a runtime interface of a runtime environment of the game platform in response to the modifying, the message including data representative of the content modifications, the runtime interface configured to modify the first set of widget files to match any modifications made to the second set of widget files, and to present a real-time updated view of the screen image.

2. The computer implemented method of claim 1, further comprising receiving runtime environment data that describes the runtime environment of the game platform.

3. The computer implemented method of claim 1, the content modifications including at least one of relocating a widget within the low fidelity version of the screen image, modifying the properties of a widget file in the second set of widget files, adding a new widget file to the second widget manifest file, and deleting a widget file from the second widget manifest file.

4. The computer implemented method of claim 1, the first widget manifest file and the first set of widget files for the high fidelity version of the screen image are in a one-to-one correspondence with the second widget manifest file and the second set of widget files for the low fidelity version of the screen image.

5. A system comprising:
   a processing component;
   a live authoring tool (LAT) application operative on the processing component, the LAT application to:
   receive data representative of a high fidelity version of a screen image rendered by a game platform console executing a video game application, the data representative of the high fidelity version of the screen image comprising a first widget manifest file comprised of a first set of widget files, each widget file representative of an element in the screen image and containing properties describing the element, the first widget manifest file including global properties pertaining to the screen image;
   render a low fidelity version of the screen image using the data representative of the high fidelity version of the screen image, the data representative of the low fidelity version of the screen image comprising a second widget manifest file comprised of a second set of widget files, each widget file representative of an element in the screen image and containing properties describing the element, the second widget manifest file including global properties pertaining to the screen image;
   modify the contents of the low fidelity version of the screen image, the modifying the contents of the low fidelity version of the screen image comprising modifying the second widget manifest file and the second set of widget files; and
   sending a content modification message to a runtime interface of a runtime environment of the game platform in response to the modifying, the message including data representative of the content modifications, the runtime interface configured to modify the first set of widget files to match any modifications made to the second set of widget files, and to present a real-time updated view of the screen image; and
   a display component operative on the processing component, the display component to display a low fidelity version of the screen image.

6. The system of claim 5, the content modifications including at least one of relocating a widget within the low fidelity version of the screen image, modifying the properties of a widget file in the second set of widget files, adding a new widget file to the second widget manifest file, and deleting a widget file from the second widget manifest file.

7. The system of claim 5, the widget manifest file and the first set of widget files for the high fidelity version of the screen image are in a one-to-one correspondence with the second widget manifest file and the second set of widget files for the low fidelity version of the screen image.

8. A system comprising:
   a LAT platform comprising a LAT processing component and a LAT application operative on the LAT processing component; and
   a game platform console communicatively coupled with the LAT platform, the game platform console comprising a processing component, a runtime environment, and a LAT runtime interface, the game platform console operative to:
   execute a video game application; and
   exchange data with the LAT platform;
   wherein the LAT application:
   receives data from the game platform console, the data representative of a high fidelity version of a screen image rendered by the game platform console executing the video game application, the data representative of the high fidelity version of the screen image comprising a first widget manifest file comprised of a first set of widget files, each widget file representative of an element in the screen image and containing properties describing the element, the first widget manifest file including global properties pertaining to the screen image;

renders a low fidelity version of the screen image using the data representative of the high fidelity version of the screen image, the data representative of the low fidelity version of the screen image comprising a second widget manifest file comprised of a second set of widget files, each widget file representative of an element in the screen image and containing properties describing the element, the second widget manifest file including global properties pertaining to the screen image;

modifies the contents of the low fidelity version of the screen image, the modifying the contents of the low fidelity version of the screen image comprising modifying the second widget manifest file and the second set of widget files; and sends a content modification message to a runtime interface of a runtime environment of the game platform in response to the modifying, the message including data representative of the content modifications, the runtime interface configured to modify the first set of widget files to match any modifications made to the second set of widget files; and wherein the game platform console:

sends data representative of a high fidelity version of a screen image rendered by the game platform console executing the video game application to the LAT application receives the content modification message from the LAT application;

modifies the high fidelity version of the screen in the game platform console based on the content modification message; and renders the modified high fidelity version of the screen in the game platform such that content modifications made in the low fidelity version of the screen are reflected in the high fidelity version of the screen visible in the game platform in real-time.

9. The system of claim 8, the LAT application and the game platform console communicable over a network.

10. The system of claim 8, the LAT application and the game platform console co-hosted in a single device.

11. The system of claim 8, the content modifications made to the low fidelity version of the screen image comprising modifications made to the second widget manifest file and the second set of widget files.

12. The system of claim 11, the content modifications including at least one of relocating a widget within the low fidelity version of the screen image, modifying the properties of a widget file in the second set of widget files, adding a new widget file to the second widget manifest file, and deleting a widget file from the second widget manifest file.

13. The system of claim 12, the first widget manifest file and the first set of widget files for the high fidelity version of the screen image are in a one-to-one correspondence with the second widget manifest file and the second set of widget files for the low fidelity version of the screen image.

* * * * *